US005887638A

United States Patent [19]

Yoritsune et al.

[11] Patent Number: 5,887,638

[45] Date of Patent: Mar. 30, 1999

[54] APPARATUS FOR MEASURING STRENGTH OF A MOLD AND FOR PRESSING MARKS ON THE MOLD

[75] Inventors: Manabu Yoritsune; Etsushi Hayashi, both of Toyota; Shigeaki Yamamoto, Toyohashi, all of Japan

[73] Assignee: Sintokogio, Ltd., Nagoya, Japan

[21] Appl. No.: 60,532

[22] Filed: Apr. 15, 1998

[30] Foreign Application Priority Data

Apr. 24, 1997 [JP] Japan .................................... 9-107153

[51] Int. Cl.[6] .............................. B22D 46/60; G01D 3/48

[52] U.S. Cl. ........................ 164/4.1; 164/151; 164/150.1; 73/81; 73/78

[58] Field of Search ................................ 164/4.1, 150.1, 164/151; 73/81, 78

[56] References Cited

U.S. PATENT DOCUMENTS 4,312,220 1/1982 Borgersen et al. ......................... 73/81
4,699,000 10/1987 Lasumore et al. .......................... 73/81
5,255,562 10/1993 Yamamoto et al. ........................ 73/78
5,357,786 10/1994 Lung et al. ................................ 73/81

FOREIGN PATENT DOCUMENTS 56-47242 4/1981 Japan ..................................... 164/4.1

*Primary Examiner*—Patrick Ryan
*Assistant Examiner*—I. H. Lin
*Attorney, Agent, or Firm*—Limbach & Limbach L.L.P.

[57] ABSTRACT

A method for measuring the strength of a cavity surface (2a) of a mold (2) and for simultaneously pressing one or more marks (21a, 21b) in the cavity surface (2a) is disclosed. Such marks (21a, 21b) formed in a cavity surface of a mold are transferred to a cast when it is produced from the mold, and the transferred marks appearing on the surface of the cast display some information. The method includes the steps of pressing one or more marks (21a, 21b) in a cavity surface of a mold by using a press member (14) that has a pressure sensor (15), and measuring the strength of the mold (2) by detecting a reaction force by the pressure sensor (15) that acts on the press member (14) when the press member presses the mark in the cavity surface of the mold.

4 Claims, 2 Drawing Sheets

APPARATUS FOR MEASURING STRENGTH OF A MOLD AND FOR PRESSING MARKS ON THE MOLD

FIELD OF THE INVENTION

This invention relates to an apparatus and a method for measuring the strength of a mold at its cavity surface and for simultaneously pressing a mark or marks on the cavity surface to display some information on the mold. Hereafter, the term "a cavity surface of a mold" means an inner surface of a mold that faces its mold cavity.

DESCRIPTION OF THE PRIOR ART

Conventionally, to direct a great number of casts to be produced, imprints of letters have been formed in a cavity surface of a mold, and these letters are transferred to appear on the outer surface of a cast when it is produced from the mold. Thus a name or some necessary information is displayed on the surface of the cast so as to direct the production of the cast. Such imprints of letters have been formed in a cavity surface of a mold by an operator detachably attaching projecting letters on a pattern and by reversibly transferring these letters to a mold when it is produced from the pattern.

The operation to detachably attach such letters to a pattern is a nuisance. Further, such an operation necessitates stopping a mold-producing line. This is one factor that lowers the rate of producing molds. Further, especially due to recently enacted Law of Responsibility for Products in Japan, the amount of information that is necessary to direct the production of casts has been increasing, and providing every cast with different information is becoming necessary. Attaching and detaching such letters (or changing the letters) for every cast, which is now being carried out to meet that requirement, is extremely ineffective.

The quality of a cast is greatly affected by the good or bad condition of a mold and by the properties of the molten metal from which a cast is produced. Thus, conventionally, by measuring the strength of a mold by an operator's hand or the like, and sometimes by pressing marks in a cavity surface of a mold to be transferred to a cast, the relationship between the strength of a mold and a cast produced from this mold is examined and recorded, and then used to enhance the quality of casts to be produced.

However, in a mold-producing line where the rate of conveying molds is high, measuring the strength of the molds must be carried out one time every 0–30 seconds. This imposes on the operator hard work when he or she measures the strength of the molds by his or her hand or the like, and this also makes it difficult for him or her to measure the strength accurately.

This invention was conceived to resolve these problems. It aims to provide an apparatus and a method for effectively measuring the strength of a mold and for simultaneously pressing a mark, which will be transferred to a cast to display necessary information, in a cavity surface of the mold, without affecting the rate of mold production.

SUMMARY OF THE INVENTION

To the above end, the method of the present invention is one to measure the strength of a cavity surface of a mold and to simultaneously press a mark in the cavity surface to display information. The method includes the steps of connecting a pressure sensor to a press member that presses a mark in the cavity surface of the mold, and detecting by the pressure sensor a reaction force that acts on the press member from the cavity surface when the press member presses the mark in the cavity surface.

To the above end, the apparatus of the present invention measures the strength of a cavity surface of a mold and simultaneously presses a mark on the cavity surface to display information. The apparatus includes a press member to press a mark in a cavity surface of a mold, means for holding the press member such that the press member moves relative to the mold, a pressure sensor attached to the press member for detecting a reaction force that acts on the press member from the cavity surface when the press member presses the mark in the cavity surface, and means for calculating the strength of the cavity surface of the mold based on the data on the reaction force detected by the pressure sensor.

According to the apparatus and method of the present invention, a mark or marks which are to be transferred onto the surface of a cast to display necessary information are formed in a cavity surface of a mold by a press member. The marks are transferred onto the surface of a cast when it is produced from the mold, and the transferred marks display such information.

To read necessary information from marks to be transferred onto a cast, information is denoted by the marks. For example, by pressing hole-shaped marks in a cavity surface of a mold at predetermined points, some information denoting the position or the array of the hole-shaped marks can be read. For another example, by pressing marks of a particular shape in a cavity surface of a mold some information denoting the shape of the marks can be read.

Accordingly, if the press member presses round, hole-shaped marks in a cavity surface of a mold, the shape of the press member may be like a needle or a bar to form round, hole-shaped prints in the cavity surface. If the press member presses marks of particular shapes, it may be in that shape.

The press member is held by holding means such that it can move relative to a mold. When the press member is pressed against a cavity surface of a mold, a mark is formed in the cavity surface. Thus, to press a mark or marks in a cavity surface of a mold the press member must be moved vertically by the holding means. Thus the holding means has lifting means. When some information is read from the positions of the marks, the press member must be held such that it can move horizontally as well as vertically. Thus the holding means also has means to move the press member vertically.

According to the present invention, a pressure sensor is connected to the press member which presses a cavity surface of a mold. When the press member is pressed against a cavity surface, a reaction force acts on it. The reaction force depends on the strength (hardness) of the cavity surface of the mold, and it is detected by the pressure sensor, which is attached to the press member. Such a pressure sensor may be a load cell. The data on the detected values are transferred to calculating means to calculate the strength of the cavity surface of the mold.

As will be understood from the above description, in the apparatus and method of the present invention for measuring the strength of a mold and for pressing marks on the mold, since marks are formed directly in a cavity surface of a mold, marks to display necessary information can be effectively formed in the cavity surface. Further, since the strength of the mold is obtained from the calculation of the value of the reacting force detected by a press sensor, which is connected to the press member, the strength of the mold is effectively and accurately obtained. Further, since the strength is measured when marks are formed in a cavity surface of a mold, this invention helps increase the rate of mold production.

Further, since an accurate strength of a mold is obtained, the relationship between the strength of a mold and the resulting cast that is produced from the mold can be accurately examined and recorded. Thus this invention helps improve the quality of a cast.

DESCRIPTION OF THE PREFERRED EMBODIMENTS

The preferred embodiments are now explained by reference to the accompanying drawings.

Figure 1:
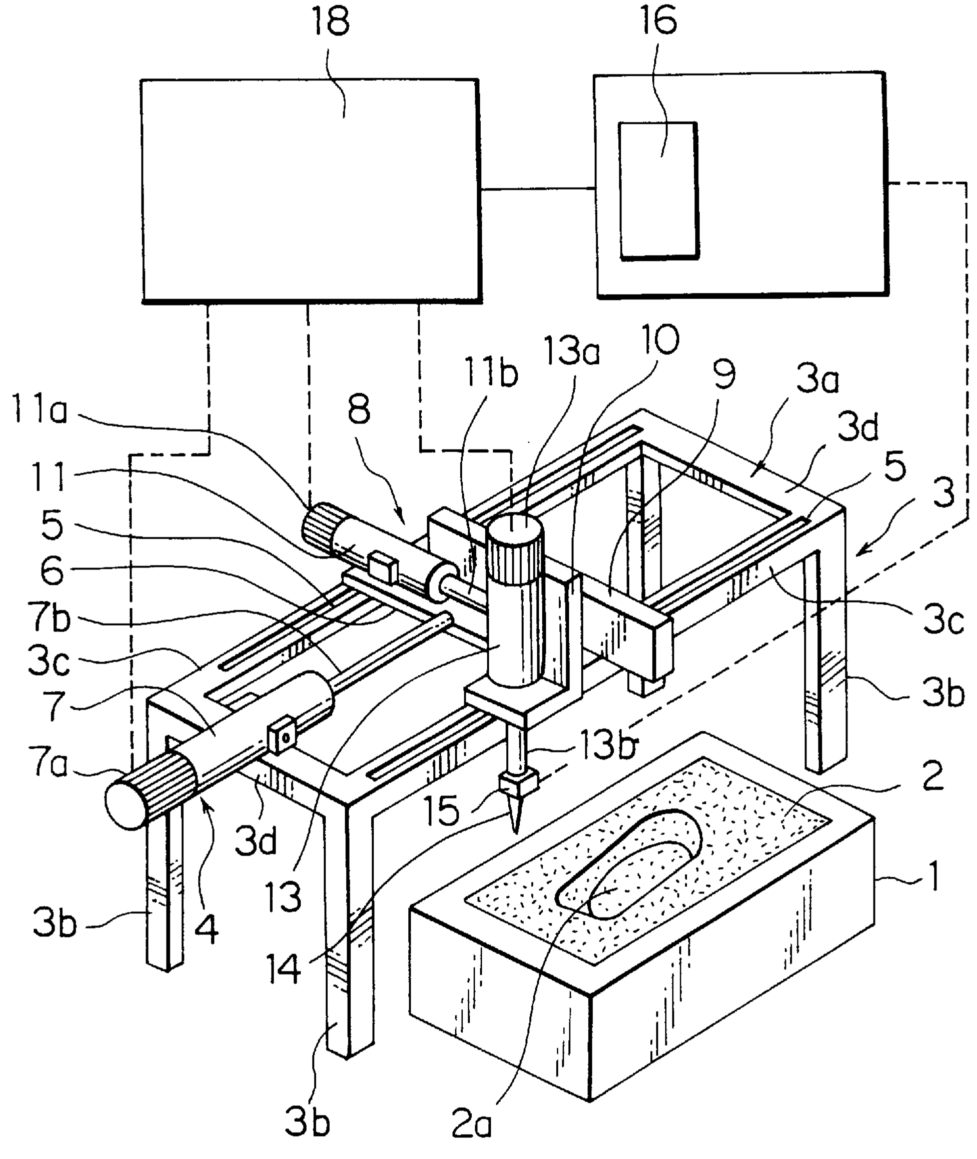
FIG. 1 is a schematic, perspective view of an embodiment of the apparatus of the present invention for measuring the strength of a mold and for simultaneously pressing a mark on the mold.

FIG. 1 shows an embodiment of the apparatus of the present invention for measuring the strength of a mold and for pressing marks on the mold. The apparatus includes a gantry frame 3, which serves as a base table, a press member 14, which is in the form of a needle having a sharp tip, for pressing a mark or marks in a cavity surface 2*a* of a mold 2, a lifting means 13 (a third servomotor-driven cylinder) to vertically move the press member 14, means 4 to move the press member 14 in the right and left directions, means 8 to move the press member 14 in the front and rear directions, a control panel 18, which controls the lifting means 13 and the moving means 4, 8, and calculating means 16, which send instructions to the control panel 18, and which also calculate the strength of the mold based on a detected value of a load cell (this load cell is explained below). The front and rear directions mean the directions in which the molds 2 are conveyed forward and backward, and the right and left directions mean the directions that are horizontal and perpendicular to the front and rear directions.

The gantry frame 3, which serves as a base table, has an upper, rectangular, open frame part 3*a* and four legs 3*b*. The upper frame part 3*a* is comprised of a pair of horizontal bars 3*c,* which extend in the right and left directions, and a pair of horizontal bars 3*d,* which extend in the front and rear directions. A pair of rails 5 are mounted on the horizontal bars 3*c*. The gantry frame 3 is disposed adjacent a molding machine (not shown) such that a plurality of molds 2, each of which is held in a flask 1, and each of which has been sent from the molding machine, advance under the gantry frame 3 in the front direction.

A runner table 6 is mounted on the pair of rails 5 of the gantry frame 3 such that it runs in the right and left directions. A first servomotor-driven cylinder 7 is secured to the bar 3*d* of the upper frame part 3*a,* and the distal end of the piston rod 7*b* of the first cylinder 7 is connected to the runner table 6. Thus the runner table 6 is reciprocatingly moved in the right and left directions when the first cylinder 7 is operated to retract or extend its piston rod 7*b*. The runner table 6 and the first servomotor-driven cylinder 7 make up the means to move the press means in the right and left directions.

Further, a linear guide 9, which extends in the front and rear directions, is mounted on the runner table 6, and a runner frame 10 is mounted on the linear guide 9 such that it can move along the linear guide 9 in the front and rear directions. A second servomotor-driven cylinder 11 is mounted on the runner table 6, and the distal end the piston rod 11*b* of the cylinder 11 is connected to the runner frame 10 such that the runner frame 10 moves in the front and rear directions when the cylinder 11 is operated to extend and retract its piston rod 11*b*. The linear guide 9, the runner frame 10, and the second servomotor-driven cylinder 11, together make up the means 8 for moving the press member 14 in the front and rear directions.

Further, the lifting means 13 (the third servomotor-driven cylinder) is mounted on the runner frame 10. A load cell 15, which serves as a pressure sensor, is attached to the distal end of the piston rod 13*b* of the lifting means 13, and the press member 14 is attached to a sensitive portion of the load cell 15. The load cell 15 detects a reaction force that acts on the press member 14 from a cavity surface 2*a* of a mold 2 when the press member 14 presses a mark in the cavity surface 2*a*.

The press member 14, which presses a mark in a cavity surface 2*a* of a mold 2, is held by the lifting means 13 such that it can move vertically. The press member 14 and the lifting means 13 are reciprocatingly moved in the front and rear directions by the front-and-rear moving means 8. The press member 14, the lifting means 13, and the front-and-rear moving means 8, are together reciprocatingly moved in the right and left directions by the right-and-left moving means 4. The means 4, 8 and lifting means 13 make up holding means, which serve as means to hold the press member 14 and move it relative to a mold.

The calculating means 16 is electrically coupled to the load cell 15 so as to receive data on the value of the detected reaction force from it and so as to calculate the strength of a cavity surface of a mold based on the data. Expressions or equations that are necessary to obtain the strength of a cavity surface 2*a* from the data of the load cell 15 have been previously input in the calculating means 16. The control panel 18, which is electrically coupled to the calculating means 16, is connected to the servomotors 7*a,* 11*a,* 13*a* of the first, second, and third servomotor-driven cylinders 7, 11, 13 respectively so as to control them.

While the apparatus operates, molds 2, each of which is held in a flask 1, are intermittently advanced from the molding machine (not shown) to the apparatus, and their advance is stopped when one mold is located at a position below the press member 14 shown in FIG. 1. The control panel 18 is then directed by the calculating means 16 to operate the moving means 4, 8 and lifting means 13. That is, by extending and retracting the piston rod 7*b* of the first servomotor-driven cylinder 7, the press member 14, the lifting means 13, and the front-and-rear moving means 8, are together moved in the right and left directions, while by extending and retracting the piston rod 11*b* of the second servomotor-driven cylinder 11, the press member 14 and the lifting means 13 are together moved in the front and rear directions. The press member 14 is located above a point in the cavity surface 2*a* where a mark is formed by it.

The piston rod 13*b* of the lifting means 13 (third servomotor-driven cylinder) is then lowered until the press member 14 pierces the cavity surface 2*a* to a predetermined depth, so that the cavity surface 2*a* of the mold 2 is permanently deformed there where a hole-shaped print or mark is formed. To display on the mold necessary information, more marks may be repeatedly formed in the cavity surface 2*a* by the press member 14. When it presses the cavity surface 2*a*, it receives a reaction force from the surface that corresponds to the strength (hardness) of the surface. This reaction force is detected by the load cell 15. The value of the reaction force detected by the load cell 15 is transmitted to the calculating means 16 as data on the force, and the calculating means 16 then calculates the strength of the cavity surface 2*a* based on that data.

After the mark or marks are formed in the cavity surface of the mold, this mold and the other molds, which are all being sent from the molding machine, are again advanced, and the next leading mold is processed by the press member 14.

Although in the above embodiment the press member 14 is shaped like a needle, it may have a tip that has a small star-like cross section, or any other cross section, on which some information is denoted.

As will be understood from the above description, while one or more marks are formed speedily in the cavity surface at one or more predetermined points by plastically deforming it, the strength of a cavity surface of a mold can be obtained.

When a cast is produced from such a mold that has press marks in its cavity surface, the marks are transferred onto the surface of the cast.

Figure 2:
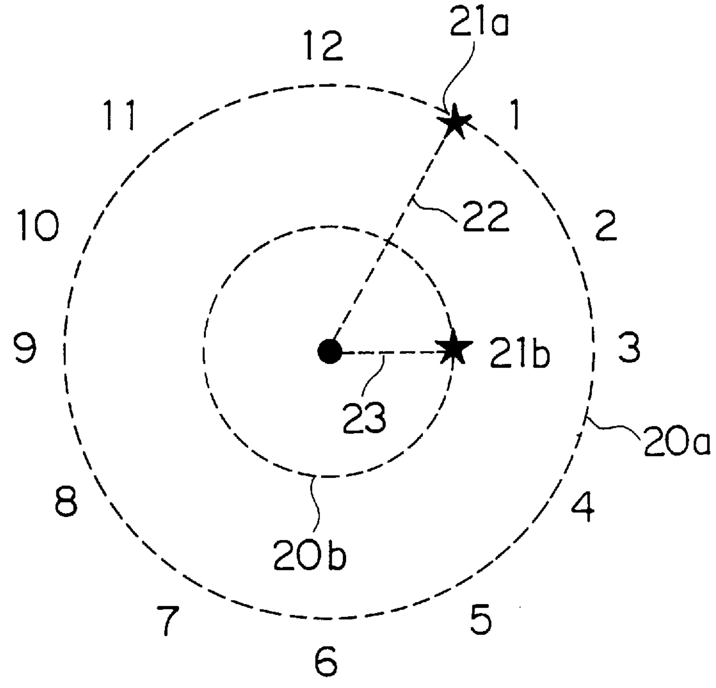
FIG. 2 is an explanatory drawing showing how information is read from hole-shaped marks formed in a cavity surface of a mold at predetermined places.

In FIG. 2 an example is now explained. In it hole-shaped marks are formed in a cavity surface of a mold, and some information denoted by the marks is read. A first mark 21*a* is formed in a cavity surface of a mold by the press member 14. The position (point) of the first mark 21*a* is on an imaginary, large circle 20*a* shown by a dotted circle. Also, a second mark 21*b* is formed in the cavity surface. The position (point) of the second mark 21*b* is on an imaginary, eccentric, small circle 20*b* shown by a dotted circle. If a line connecting the second mark 21*b* and the center of the two imaginary circles is considered as the hour hand of a watch, and if a line connecting the first mark 21*a* and the center of the circles is considered as the minute hand, the marks 21*a*, 21*b* give information on that time as 3:04. From this information, for example, the information 34 may be read.

Figure 3:
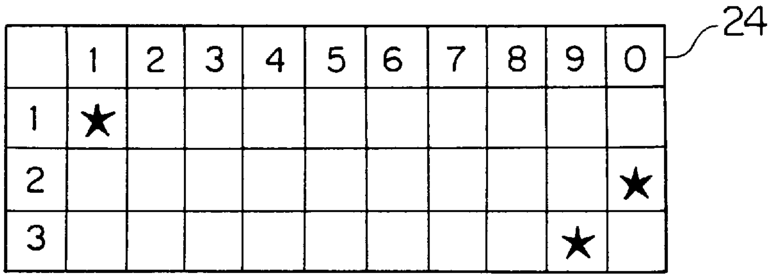
FIG. 3 is another explanatory drawing showing how information is read from marks formed in a cavity surface of a mold at predetermined places.

In FIG. 3 another example is explained. A mark that displays a table 24 like a scoreboard for a baseball game is attached on the surface of a pattern, and a mold is produced from the pattern. Thus the mold has a table in its cavity surface that has been reversibly transferred from the table 24 of the pattern. A plurality of marks (for example, three star-like marks as shown in the drawing) are formed by the press member 14 in the table on the cavity surface of the mold at the positions shown in FIG. 3. From these marks, information on the three stars and the number 109 is read.

The embodiments explained above are exemplary only, and the scope of the invention is not limited to them. It will be clear to one skilled in the art that any modification may be made to the embodiments without departing from the scope of the claims that follow.

What we claim is:

1. A method for measuring strength of a cavity surface of a sand mold and for simultaneously pressing in the cavity surface one or more marks that display some information, said method comprising the steps of:

pressing a mark in the cavity surface of the mold by pressing a press member against said cavity surface, wherein the press member is coupled to a pressure sensor configured to sense a reaction force exerted on the press member by the cavity surface during the pressing of said mark in said cavity surface;

generating measurements of the reaction force exerted on the press member by the cavity surface when said press member presses said mark in the cavity surface of the mold, wherein the measurements are generated by the pressure sensor in response to the Dressing of said mark in said cavity surface; and determining the strength of the cavity surface of the mold from said measurements.

2. The method of claim 1, also including the step of:

pressing marks other than said mark in the cavity surface, by sequentially pressing the press member against a sequence of different locations on said cavity surface, so that said marks, together with said mark, display said information.

3. An apparatus for measuring strength of a cavity surface of a sand mold and for simultaneously pressing in the cavity surface a mark that displays some information, comprising:

a press member configured to press the mark in the cavity surface of the mold;

a press member positioning unit coupled to the press member and configured to move said press member over a desired location on the cavity surface and to press said press member against the location on the cavity surface, thereby causing the press member to press the mark in the cavity surface at said location;

a pressure sensor coupled to said press member and configured to generate data indicative of a reaction force exerted on said press member by the cavity surface of the mold when said press member presses said mark in said cavity surface of the mold; and calculating means coupled to the pressure sensor and configured to calculate strength of the cavity surface of the mold by processing the data generated by the pressure sensor.

4. The apparatus of claim 3, also including:

a control unit, coupled to the press member positioning unit and to the calculating means, and configured to cause the press member positioning unit to cause the press member to press a sequence of the marks in a sequence of different locations on the cavity surface, and to cause the calculating means to calculate the strength of the cavity surface at at least one of said sequence of different ones of the locations on the cavity surface.

* * * * *